April 2, 1929.　　　L. H. MORIN　　　1,707,231
KITCHEN UTENSIL
Filed Oct. 5, 1927
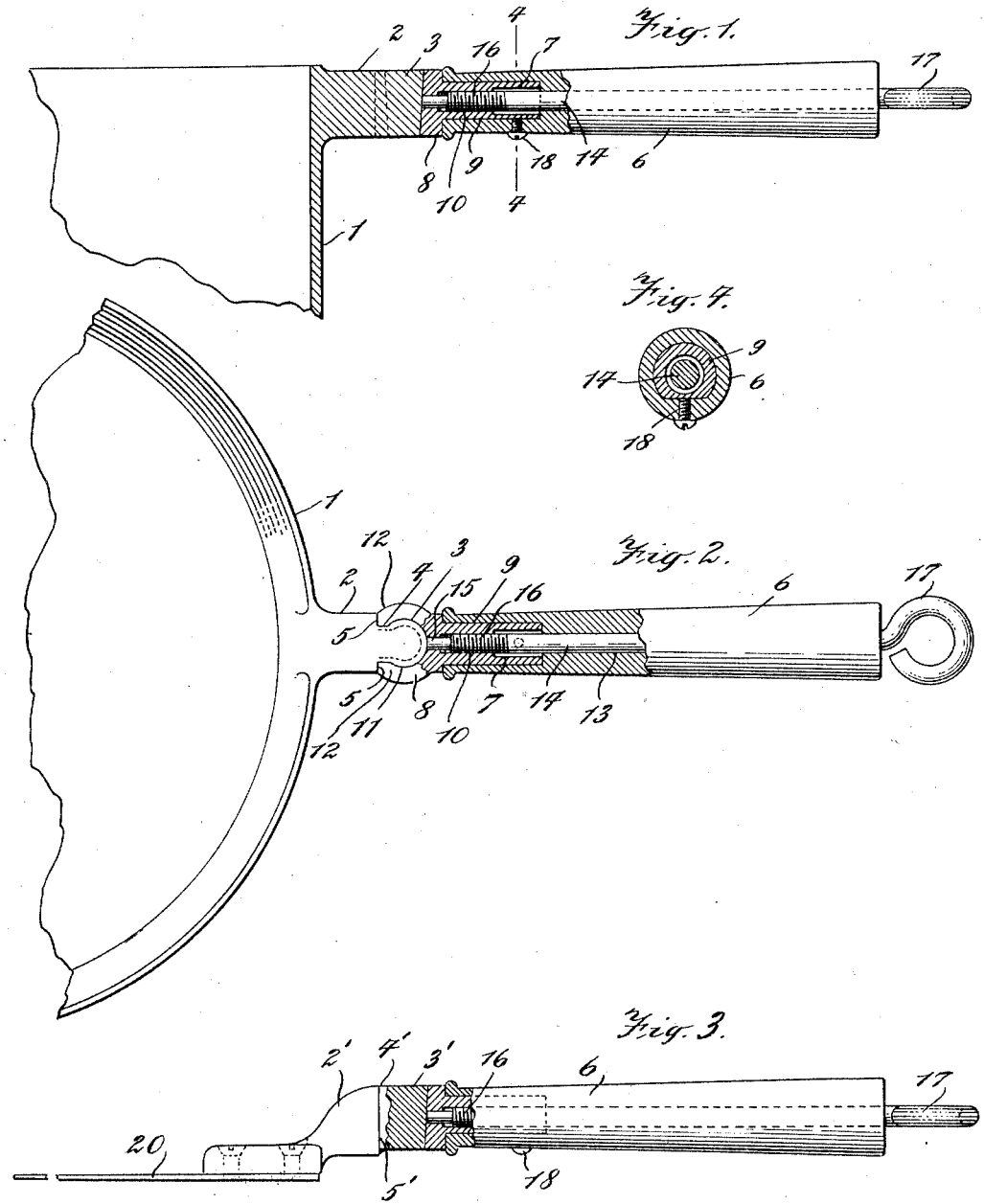
INVENTOR.
Louis H. Morin
BY
ATTORNEYS.

Patented Apr. 2, 1929.

1,707,231

UNITED STATES PATENT OFFICE.

LOUIS H. MORIN, OF NEW YORK, N. Y., ASSIGNOR TO DOEHLER DIE-CASTING CO., A CORPORATION OF NEW YORK.

KITCHEN UTENSIL.

Application filed October 5, 1927. Serial No. 224,053.

My invention relates to kitchen utensils and more particularly to the provision of improved means for handling such appliances while in heated condition. Cooking vessels are frequently of large size and of considerable weight when filled. It is a matter of difficulty to lift such an appliance and remove it from a burner or oven when highly heated, especially since ovens are frequently located near the floor or in other positions difficult of access.

In order to raise such a vessel readily and without danger of spilling its contents it is desirable to have an outwardly extending handle of considerable length. Such handle should be detachable so that the vessel or pan may be used in a hot oven, and the handle and utensil should be so combined as (1) to permit the ready engagement and disengagement of the handle (2) to enable the parts uniting the vessel and handle to easily carry the weight of the vessel and contents without any lateral tipping, turning or lost motion (3) to provide supplemental locking means usable at the option of the user whenever it is desired to prevent disengagement of the uniting parts, and (4) to adapt the handle for interchangeable use with vessels and utensils of various forms which may be useful in and about the preparation of meals and the subsequent clearing up.

With the foregoing objects in view, I have devised an improved form of handle and have combined the same with a kitchen utensil in such a manner as to form a novel union having the characteristics above set forth.

Reference is hereby made to the accompanying drawings, of which:

Fig. 1 is a side elevation partly in section of my improvement applied to a sauce pan or baking pan;

Fig. 2 is a plan view partly in section showing the improvement applied to a frying pan;

Fig. 3 is a side view partly in section showing the improved handle applied to a scraper, and Fig. 4 is a section on line 4—4 of Fig. 1.

The utensil 1 may be of any desired form or size and is provided with an extension 2 the outer end of which is formed with a vertically tapered head 3 connected with the body portion by a reduced neck portion 4. The tapered surface when viewed from above extends in an arc of more than 180° degrees. Laterally extending shoulders 5, 5 are formed at the base of the neck.

The handle consists of a body portion 6 of any suitable material. At the forward end of the body is a cylindrical recess 7 into which extends the holding member 8 which is preferably of metal and consists of the rearwardly extending sleeve 9 having an internally threaded bore 10 and a forward portion formed with a vertically tapered socket 11. A set screw 18 threaded in the body 6 secures the sleeve in position. The degree of taper of the socket 11 is the same as that of the head 3 of the utensil 1. The forward portion of the socket 11 is cut away as shown to enable it to closely engage the extension head 3 of the cooking utensil. The arms 12, 12 within which the socket is formed preferably embrace the neck 4 as shown in Fig. 2 and the ends of said arms 12 abut against the shoulders 5. The wedging action of the tapered surfaces forms a firm union between the handle and the utensil which enables the latter to be readily lifted, and the arms 12 coact with the neck 4 and shoulders 5 to prevent any lateral movement of the handle with respect to the utensil.

The handle may be readily engaged with the utensil by placing the forward end of the handle directly below the head 3 of the extension 2 and raising the handle vertically so that the socket 11 will receive the head 3 and such union is ordinarily of sufficient rigidity for the purpose of handling the utensil. In some cases, however, where the utensil and contents are more than ordinarily difficult to handle by reason of their weight or heated condition it is desirable to increase the rigidity of the union and prevent any possible disengagement of parts and this may be readily effected by locking means which will now be described.

The body 6 of the handle is formed with a longitudinal bore 13 extending entirely through the handle in axial alignment with the bore 10 of the sleeve 7. Within this bore is situated the locking rod or set screw 14 the forward end 15 of which is of reduced cross section and adapted to abut against the head 3. A portion of the rod is threaded as shown at 16 for engagement with the internal thread 10 of the sleeve 7. The rear end of the rod 14 is bent to form a handle 17 by which it may readily be turned to effect the locking and unlocking of the handle with respect to the utensil. As the rod 14 when acting as a set screw prevents any possibility of a lateral turning movement of the handle, it is obvious that some of the advantages of the invention may be obtained even though the arms 12 are not shaped for engagement with the neck 4 and shoulders 5.

The improved handle may be used with various interchangeable attachments, as for example in Fig. 3 a scraper blade 20 is shown, having an extension 2' formed with shoulders 5', neck 4' and tapered head 3' identical in shape and size with the parts 5, 4 and 3 which have been previously described, thus adapting the scraper blade to be firmly held by the detachable handle.

Having now described my invention what I claim is:

1. The combination of a utensil having an extension formed with a vertical taper and a detachable handle having at one end a socket formed with a vertical taper to engage the taper of said extension and threaded locking means within said handle to engage said extension and thereby clamp the handle thereto.

2. The combination of a utensil having an extension formed with a vertical taper, a detachable handle having at one end a socket formed with a vertical taper to engage the taper of said extension and threaded locking means carried by the handle and extending through said socket to engage with the taper of said extension and thereby clamp the handle thereto.

3. A detachable handle having at one end a tapered socket the forward wall of which is cut away, a bore extending through the handle to the interior of the socket and having an internal thread, and locking means engaging said thread and movable longitudinally to enter said socket within said bore.

4. A detachable handle having at one end vertically tapered holding means, and threaded locking means carried by the handle in such position that when rotated it will engage a member fitted to said tapered holding means.

5. A detachable handle having at one end an internally threaded sleeve, the forward end of which is formed with a vertically tapered socket, a body within one end of which the rear portion of said sleeve is fitted, a bore longitudinal to said body and concentric to the thread of said sleeve, and a threaded rod within said sleeve and bore.

6. A detachable handle having at one end a tapered socket, a bore extending longitudinally of the handle from the interior of the socket to its opposite end, said bore having an internal thread, and a rod within said bore and extending from the interior of the socket to the opposite end of the handle, said rod having a thread engaging said internal thread and turning means at one end outside of said handle.

In witness whereof, I hereunto subscribe my signature.

LOUIS H. MORIN.